United States Patent
Zhang et al.

(10) Patent No.: US 11,489,641 B2
(45) Date of Patent: Nov. 1, 2022

(54) METHOD AND DEVICE FOR MEASUREMENT RESTRICTION

(71) Applicant: Nokia Solutions and Networks Oy, Espoo (FI)

(72) Inventors: Li Zhang, Beijing (CN); Haitao Li, Beijing (CN)

(73) Assignee: Nokia Solutions and Networks OY, Espoo (FI)

(*) Notice: Subject to any disclaimer, the term of this patent is extended or adjusted under 35 U.S.C. 154(b) by 85 days.

(21) Appl. No.: 16/650,577

(22) PCT Filed: May 10, 2018

(86) PCT No.: PCT/CN2018/086399
§ 371 (c)(1),
(2) Date: Mar. 25, 2020

(87) PCT Pub. No.: WO2019/213923
PCT Pub. Date: Nov. 14, 2019

(65) Prior Publication Data
US 2020/0228269 A1 Jul. 16, 2020

(51) Int. Cl.
*H04W 4/00* (2018.01)
*H04L 5/00* (2006.01)
(Continued)

(52) U.S. Cl.
CPC .......... *H04L 5/0048* (2013.01); *H04L 5/0073* (2013.01); *H04W 24/10* (2013.01);
(Continued)

(58) Field of Classification Search
None
See application file for complete search history.

(56) References Cited

U.S. PATENT DOCUMENTS

| 2012/0113812 A1 | 5/2012 | Ji et al. |
| 2012/0157082 A1 | 6/2012 | Pedersen et al. |

(Continued)

FOREIGN PATENT DOCUMENTS

| JP | 2015530044 A | 10/2015 |
| WO | WO 2012/173565 A1 | 12/2012 |
| WO | WO 2019/217065 A1 | 11/2019 |

OTHER PUBLICATIONS

International Search Report for PCT/CN2018/086399 dated Feb. 2, 2019.

(Continued)

*Primary Examiner* — Zewdu A Beyen
(74) *Attorney, Agent, or Firm* — Fay Sharpe LLP

(57) ABSTRACT

Embodiments of the present disclosure provide methods, devices and a computer readable medium for a restriction on a measurement for a neighbor cell. According to a method implemented by a network device in a communication system, the network device determines a neighbor cell on a frequency layer capable of cell reference signal (CRS) muting. A cell reference signal in the neighbor cell is transmitted on a predetermined physical resource if the neighbor cell enables CRS muting. In response to the determination, the network device transmits measurement restriction information to a terminal device in a cell of the network device. The measurement restriction information indicates that a radio resource management (RRM) measurement for any neighbor cell on the frequency layer is restricted to be performed on the predetermined physical resource. The embodiments of the present disclosure improve a measurement for a neighbor cell.

15 Claims, 4 Drawing Sheets

(51) Int. Cl.
- *H04W 76/27* (2018.01)
- *H04W 24/10* (2009.01)
- *H04W 36/00* (2009.01)
- *H04W 72/04* (2009.01)
- *H04W 74/00* (2009.01)

(52) U.S. Cl.
CPC ..... *H04W 36/0094* (2013.01); *H04W 72/042* (2013.01); *H04W 74/006* (2013.01); *H04W 76/27* (2018.02)

(56) References Cited

U.S. PATENT DOCUMENTS

| | | | | |
|---|---|---|---|---|
| 2013/0322350 | A1* | 12/2013 | Gaur | H04L 1/0069 370/329 |
| 2014/0112254 | A1* | 4/2014 | Lindoff | H04W 74/002 370/328 |
| 2017/0366999 | A1* | 12/2017 | Tsuboi | H04L 43/16 |
| 2018/0102817 | A1 | 4/2018 | Park et al. | |
| 2018/0279299 | A1* | 9/2018 | Park | H04W 72/0453 |

OTHER PUBLICATIONS

Ericsson, "Signaling aspects of CRS muting in eMTC", 3GPP TSG-RAN WG2 #101bis, R2-1805183, 3 pages, Sanya, P.R. of China, Apr. 2018.

Ericsson, Nokia and Nokia Shanghai Bell, "WF on RRM with network-based CRS interference mitigationz", 3GPP TSG-RAN WG4 #86Bis, R4-1805557, 5 pages, Melbourne, Australia, Apr. 2018.

Huawei, HiSilicon, "On CRS muting for BL UEs", 3GPP TSG RAN WG2 #101bis, R2-1804840, 4 pages, Sanya, China, Apr. 2018.

Intel Corporation, "Further discussion on CRS muting in NW based CRS-IM", 3GPP TSG-RAN4 #86, R4-1801817, 6 pages, Athens, Greece, Mar. 2018.

Intel Corporation, "Network-based CRS mitigation impact on advanced receivers", 3GPP TSG-RAN WG4#86bis, R4-1804177, 2 pages, Busan, South Korea, Apr. 2018.

MediaTek Inc., "RRM Measurement impacts", 3GPP TSG-RAN WG4 #84Bis, R4-710665, 5 pages, Dubrovnik, Oct. 2017.

Nokia, Nokia Shanghai Bell, "Cell access impact of CRS muting in eMTC", 3GPP TSG-RAN WG2 #102, R2-1807681, 4 pages, Busan, Republic of Korea, May 2018.

Nokia, Nokia Shanghai Bell, "Neighbour cell measurement with CRS muting", 3GPP TSG-RAN WG4 #87, R4-1806633, 3 pages, Melbourne, Australia, May 2018.

Qualcom Incorporated, "Discussion on the open issues for network-based CRS muting", 3GPP TSG-RAN WG4 #86bis, R4-1805404, 3 pages, Melbourne, Australia, Apr. 2018.

TSG RAN RAN4, "LS on Signalling CRS muting information for Release 15 MTC UE", 3GPP RAN WG4, #86, R4-1803492, 1 page, Athens, Greece, Mar. 2018.

* cited by examiner

METHOD AND DEVICE FOR MEASUREMENT RESTRICTION

FIELD

Embodiments of the present disclosure generally relate to wireless communication, and in particular, to methods, devices and a computer readable medium for a restriction on a measurement for a neighbor cell.

BACKGROUND

In wireless communications, Cell Reference Signal (CRS) muting is a novel feature realizing reduced CRS transmissions. For a cell with CRS muting enabled, a Radio Resource Management (RRM) measurement for this cell only can be performed on particular Physical Resource Blocks (PRBs) with an always-on CRS. If a UE performs the measurement outside of these PRBs (or bandwidth), measurement results may be wrong.

In contrast, for a cell with CRS muting disabled, a UE can measure the cell in any bandwidth. For an enhanced Machine Type Communication (eMTC) UE, the measurement may be performed in any narrow band in a cell bandwidth. For a normal UE, the measurement may be done in a full cell bandwidth, depending on UE implementation.

Additionally, CRS muting is a cell level feature, that is, it can be enabled or disabled on a cell basis. This means that neighbor cells, either on a same or on a different carrier than a serving cell, may be in a different CRS muting state from the serving cell. For example, it is possible that CRS muting is enabled in the serving cell but disabled in a neighbor cell, or CRS muting is disabled in the serving cell but enabled in a neighbor cell.

In a communication network with CRS muting enabled in some cells and disabled in some other cells, it is desirable to ensure that UEs perform neighbor cell measurements on correct bandwidths.

SUMMARY

In general, example embodiments of the present disclosure provide methods, devices and a computer readable medium for a restriction on a measurement for a neighbor cell.

In a first aspect, there is provided a method implemented by a network device in a communication system. The method comprises determining a neighbor cell on a frequency layer capable of CRS muting, a cell reference signal in the neighbor cell being transmitted on a predetermined physical resource if the neighbor cell enables CRS muting. The method also comprises in response to the determination, transmitting measurement restriction information to a terminal device in a cell of the network device, the measurement restriction information indicating that a RRM measurement for any neighbor cell on the frequency layer is restricted to be performed on the predetermined physical resource.

In a second aspect, there is provided a method implemented by a terminal device in a communication system. The method comprises receiving, from a network device, measurement restriction information indicating that a RRM measurement for any neighbor cell on a frequency layer is restricted to be performed on a predetermined physical resource. The method also comprises performing, on the predetermined physical resource, the RRM measurement for a neighbor cell on the frequency layer.

In a third aspect, there is provided a network device. The network device comprises a processor and a memory coupled to the processor and storing instructions thereon. The instructions, when executed by the processor, cause the network device to perform acts. The acts comprise determining a neighbor cell on a frequency layer capable of CRS muting, a cell reference signal in the neighbor cell being transmitted on a predetermined physical resource if the neighbor cell enables CRS muting. The acts also comprise in response to the determination, transmitting measurement restriction information to a terminal device in a cell of the network device, the measurement restriction information indicating that a RRM measurement for any neighbor cell on the frequency layer is restricted to be performed on the predetermined physical resource.

In a fourth aspect, there is provided a terminal device. The terminal device comprises a processor and a memory coupled to the processor and storing instructions thereon. The instructions, when executed by the processor, cause the terminal device to perform acts. The acts comprise receiving, from a network device, measurement restriction information indicating that a RRM measurement for any neighbor cell on a frequency layer is restricted to be performed on a predetermined physical resource. The acts also comprise performing, on the predetermined physical resource, the RRM measurement for a neighbor cell on the frequency layer.

In a fifth aspect, there is provided a computer readable medium having instructions stored thereon. The instructions, when executed on at least one processor of a device, cause the device to carry out the method according to the first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
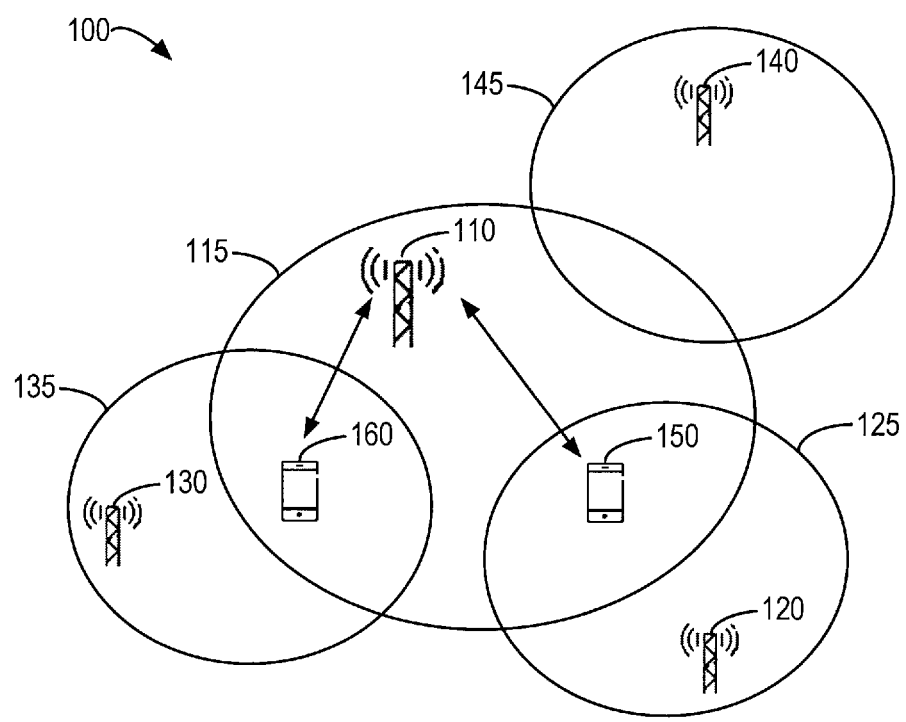
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

The term "circuitry" used herein may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor (s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 shows an example communication network 100 in which embodiments of the present disclosure can be implemented. The network 100 includes four network devices 110, 120, 130, and 140, which have their respective serving areas called as cells 115, 125, 135, and 145, respectively.

As shown, a terminal device 150 is served by the network device 110. In other words, the cell 115 of the network device 110 is a serving cell for the terminal device 150. The terminal device 150 is also located in and may be handed over to the cell 125. Likewise, a terminal device 160 is served by the network device 130. In other words, the cell 135 of the network device 130 is a serving cell for the terminal device 160. The terminal device 160 is also located in and may be handed over to the cell 115. As further described below, this handover may need a RRM measurement on a target cell.

Due to proximity to the serving cell 115 of the terminal device 150, the cells 125, 135 and 145 may be referred to as neighbor cells of the cell 115 or the network device 110, and the network devices 120, 130, and 140 may be referred to as neighbor network devices. Similarly, due to proximity to the serving cell 135 of the terminal device 160, the cells 115, 125 and 145 may be referred to as neighbor cells of the cell 135 or the network device 130, and the network devices 110, 120, and 140 may be referred to as neighbor network devices.

From a perspective of the terminal device 150, the neighbor cells 125, 135 and 145 may be in a same frequency layer (or band) as the serving cell 115. In some other embodiments, the neighbor cells 125, 135 and 145 may be in a different frequency layer from the serving cell 115. Alternatively, the serving cell 115 and the neighbor cells 125, 135 and 145 may be in any suitable frequency layers. The same applies to the terminal device 160, except that the cell 135 is the serving cell and the cells 115, 125, and 145 are the neighbor cells.

It is to be understood that the number of network devices and the number of terminal devices are only for the purpose of illustration without suggesting any limitations. The network 100 may include any suitable number of network devices and terminal devices adapted for implementing embodiments of the present disclosure. Although not shown, it would be appreciated that one or more terminal devices may be located in the cells 115, 125, 135, and 145 and served by the network devices 110, 120, 130, and 140.

The communications in the network 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In order for a terminal device (such as the terminal device 150 and 160) accessing the cells 115, 125, 135, or 145 and communicating with the network devices 110, 120, 130, or 140, the network devices 110, 120, 130, or 140 may transmit respective cell reference signals (CRSs) in respective cells 115, 125, 135, and 145. For example, the cell reference signal may be used by the terminal device 150 or 160 to estimate or demodulate a downlink channel, detect a quality of the downlink channel, perform a Radio Resource Management (RRM) measurement on the related cell, or the like.

As discussed above, CRS muting is a novel feature realizing reduced CRS transmissions. Support of CRS muting is one objective in recent development of wireless communication. The benefits of CRS muting are reduced power consumption and interference in the network due to the reduced CRS transmissions. This objective has been so far mainly discussed, in order to achieve minimum CRS transmissions and ensure that RRM and demodulation at a UE are not broken due to CRS muting.

It is also considered to define signaling for indicating to a UE whether CRS muting is enabled in the cell or not. However, this raises an issue of neighbor cell measurement, since it has been so far only considered CRS muting in serving cell. As indicated above, in a communication network with CRS muting enabled in some cells and disabled in some other cells, it is desirable to ensure that UEs perform neighbor cell measurements on correct bandwidths.

One traditional solution to solve this problem is to broadcast CRS muting state for neighbor cells in broadcast signaling, such as System Information (SI). The drawback is that there could be frequent SI updates. Also, it is unlikely that a UE will adjust the measurement bandwidth for each neighbor cell.

Another traditional solution is to use an existing signaling "AllowedMeasBandwidth," which indicates a maximum allowed measurement bandwidth on a carrier frequency as defined. However, this IE only informs a UE allowed measurement bandwidth, but it does not limit where the UE should perform a measurement. Thus, the UE can also perform the measurement outside the indicated bandwidth, up to UE implementation.

In accordance with embodiments of the present disclosure, there is provided a solution for a restriction on a measurement for a neighbor cell. According to some embodiments, a serving cell may broadcast information indicating whether a measurement restriction is applied for the serving cell and/or neighbor cells. The measurement restriction may be applied by Release-15 UEs. The measurement restriction can be indicated per frequency layer or for all frequency layers.

If the measurement restriction is applied, a UE should measure all neighbor cells in the indicated frequency layer on a predetermined physical resource, such as central 6-PRB or 24-PRB in the frequency layer. If the measurement restriction is not applied, there is no restriction on the UE measurement bandwidth. In addition to broadcasting, the measurement restriction can also be signaled to the connected mode UEs via dedicated RRC signaling.

The embodiments of the present disclosure improve a measurement, in particular the RRM measurement, for a neighbor cell. Compared to traditional solutions, the embodiments of the present disclosure can avoid the frequent SI updates, since intent to employ CRS muting on a frequency layer is much more static than CRS muting state of a specific cell. Also, the embodiments of the present disclosure do not cause an issue when a cell is transmitting CRSs in a full cell bandwidth but the measurement is performed only in the predetermined physical resource, such as the central 6-PRB in the frequency layer.

Figure 2:
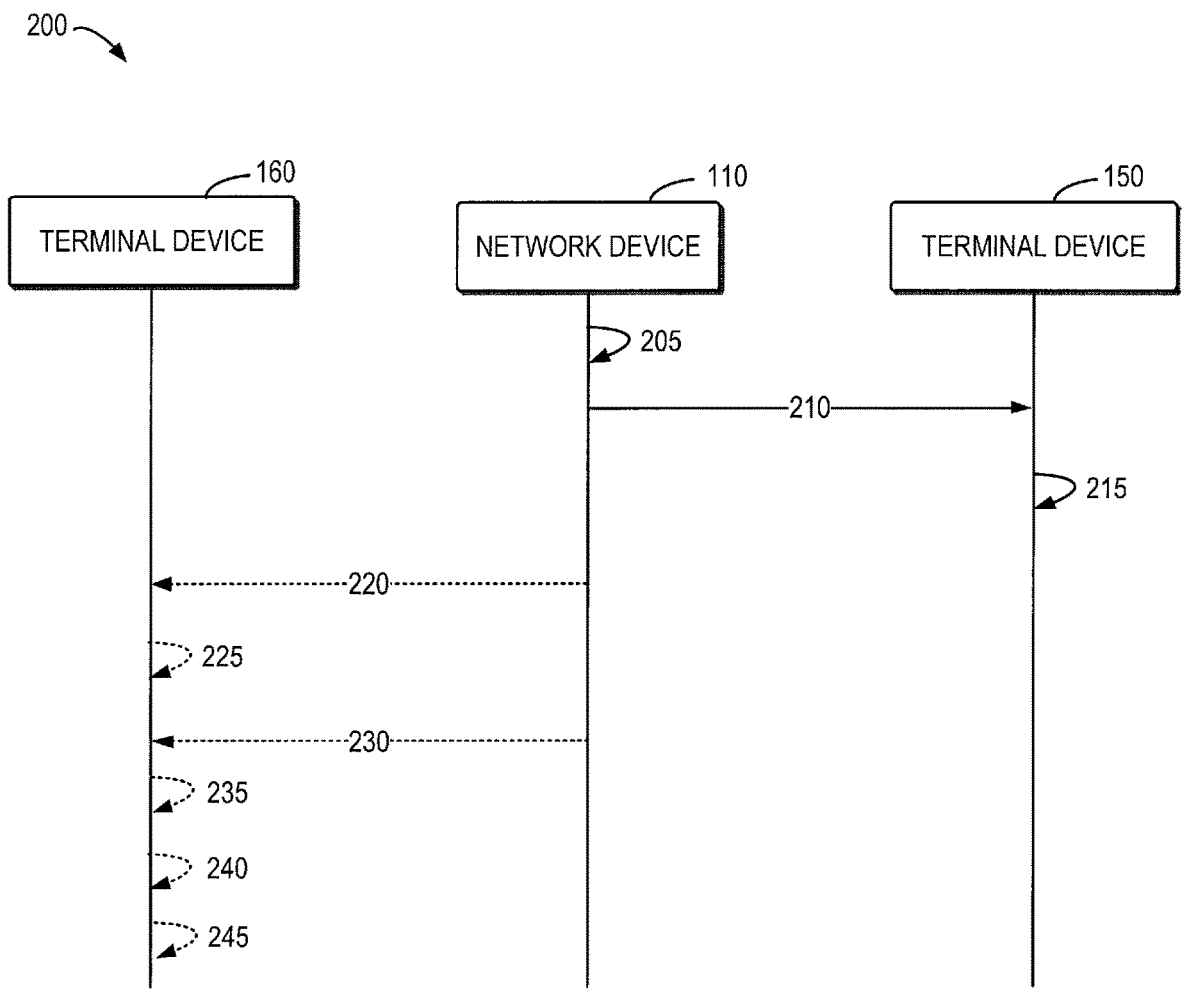
FIG. 2 is a flowchart illustrating a process of communication between a network device and a terminal device according to some embodiments of the present disclosure.

Principles and embodiments of the present disclosure will be described in detail below with reference to FIG. 2, which show a process 200 for communication between a network device and a terminal device according to different embodiments of the present disclosure. For the purpose of discussion, the process 200 will be described with reference to FIG. 1.

The process 200 may involve the network device 110 and the terminal devices 150 and 160 in FIG. 1. In some embodiments, both of the terminal devices 150 and 160 may be a Release-15 terminal device which supports the CRS muting feature and may be also referred to as an efeMTC UE. In some other embodiments, the terminal device 160 may be a Release-15 terminal device which does not support the CRS muting feature. Without loss of generality, in the following, it is assumed that the neighbor cells 125 and 135 are capable of CRS muting and the neighbor cell 145 is incapable of CRS muting.

The network device 110 determines (205) the neighbor cell 125 or 135 on a frequency layer capable of CRS muting. As an example, the network device 110 may perform this detection by communicating with the network devices 120, 130, and 140. As another example, the network device 110 may perform this detection by obtaining relevant information of the network devices 120, 130, and 140 from a control entity responsible for controlling or coordinating the network devices 110-140, such as a base station controller. Additionally or alternatively, the network device 110 may perform this detection in any possible and suitable way.

As mentioned, if the neighbor cell 125 or 135 capable of CRS muting enables CRS muting, a cell reference signal in the neighbor cell 125 or 135 will be transmitted on a predetermined physical resource. For example, the predetermined physical resource may comprise central 6 or 24 physical resource blocks (PRBs) in the frequency layer of the neighbor cell 125 or 135. In this way, the predetermined physical resource may be separate away from the predetermined physical resource of other frequency layers. Additionally or alternatively, the predetermined physical resource may include any other PRBs in the frequency layer. With CRS muting, power consumption and interference in the communication network 100 can be reduced due to reduced CRS transmissions.

In response to the neighbor cell 125 or 135 being determined, the network device 110 transmits (210) measurement restriction information to the terminal device 150 in the cell 115 of the network device 110. The measurement restriction information indicates that a RRM measurement for any neighbor cell on the frequency layer is restricted to be performed on the predetermined physical resource. In other words, from a network perspective, if there is any neighbor cell on a frequency layer can enable CRS muting, the serving cell may apply the measurement restriction for that layer. Correspondingly, the terminal device 150 receives this measurement restriction information from the network device 110.

Compared to the per cell indication in traditional solutions, this per-frequency layer indication has a benefit of infrequent SI changes and less signaling overhead, for example, one bit per frequency layer versus one bit per neighbor cell. Also, this measurement restriction indication is different from the CRS muting indication for serving cell in traditional solutions. In case all neighbor cells do not enable CRS muting, there is no need for the serving cell to set this measurement restriction for a neighbor cell. Even if a UE is capable of CRS muting, it can still perform a measurement in any narrow-band in the cell bandwidth. This is advantageous for UE's implementation.

In some embodiments, the network device 110 may broadcast the measurement restriction information via a broadcast message, such as for the terminal device 150 in a radio resource control (RRC) idle state. Thus, the measurement restriction information may be sent to all the terminal devices in the cell 115 in a transmission. Additionally or alternatively, the network device 110 may send the measurement restriction information via dedicated RRC signaling, such as for the terminal device 150 in a RRC connected state. In this way, the measurement restriction information may be sent to specific terminal devices, and thus saving power and reducing useless signaling. Accordingly, the terminal device 150 may receive the measurement restriction information via the broadcast message or the dedicated RRC signaling.

The terminal device 150 performs (215), on the predetermined physical resource, the RRM measurement for a neighbor cell 125 or 135 on the frequency layer. In general, radio resource management includes procedures for managing radio resources including scheduling, power control, handover, and load-balancing. RRM procedures performed by UEs include measurement and reporting of serving cells and neighbor cells for service continuity and resource management. For example, cell measurements may be used to determine when to handover UEs or used for channel selection for serving cells.

As described with reference to FIG. 1, the terminal device 160 is served by the network device 130 but not by the network device 110, and may possibly be handed over to the cell 115 of the network device 110. For this possible handover, the terminal device 160 may need to perform a RRM measurement for the cell 115 of the network device 110. In some embodiments, the terminal device 160 may be a Release-15 terminal device.

However, in some cases, the network device 110 may not want the terminal device 160 to access its cell 115, for example, due to a high load of the cell 115. In order to prevent the terminal device 160 as a Release-15 terminal device from accessing the cell 115, the network device 110 may broadcast (220) cell barred information specific to a Release-15 terminal device to prevent the terminal device 160 from accessing the cell 115. In the meanwhile, the terminal device 160 as a Release-15 terminal device may ignore cell barred information for a pre-Release-15 terminal device, also called as legacy terminal device. In response to receiving the barred information specific to a Release-15 terminal device, the terminal device 160 may prevent (225) from accessing the neighbor cell 115 of the network device 110.

In some embodiments, the network device 110 does not broadcast the cell barred information specific to a Release-15 terminal device. This means that Release-15 terminal devices are not prohibited by the network device 110 from accessing the cell 115. However, currently, there are some Release-15 terminal devices capable of operating with CRS muting, whereas some other Release-15 terminal devices are incapable of operating with CRS muting. In case that CRS muting is enabled in cell 115, in order to allow the Release-15 terminal devices capable of operating with CRS muting access the cell 115, and prevent the Release-15 terminal devices incapable of operating with CRS muting from accessing the cell 115, the network device 110 may broadcast (230) CRS muting information indicating whether the cell 115 enables CRS muting.

In response to the cell 115 disabling CRS muting, the terminal device 160 may access (235) the neighbor cell 115, regardless of the capability of operating with CRS muting. On the other hand, in response to the cell 115 enabling CRS muting, the terminal device 160 may access (240) the cell 115 if the terminal device 160 is a Release-15 terminal device capable of operating with CRS muting, and may prevent (245) from accessing the cell 115 if the terminal device 160 is a Release-15 terminal device incapable of operating with CRS muting.

As a specific example for the operations 220-245, when CRS muting is enabled in the cell 115, the network device 110 may set a legacy "cellBarred" Information Element (IE) in SIB1 and SIB1-BR (which works for pre-Release-15 UEs) as barred; otherwise, the IE may be set accordingly as in legacy without CRS muting feature. Additionally or alternatively, the network device 110 may introduce a new IE, for example, named as cellBarred-r15 or some other names, in SIB1-BR and this new IE works for Release-15 UEs.

Accordingly, for a legacy (pre-Release-15) UE, it may check the legacy "cellBarred" IE in SIB1/SIB1-BR to determine whether the cell 115 is considered as barred or not. For a Release-15 UE, it may ignore the legacy "cellBarred" IE in SIB1/SIB1-BR but check the new IE "cellBarred-r15" in SIB1-BR. If the cellBarred-r15 is set to barred, then the cell 115 is considered as barred, and if the cellBarred-r15 is set as not barred, the UE may further check CRS muting indication in SIB1-BR.

If CRS muting is not enabled in the cell 115, then the cell 115 is considered as not barred, if CRS muting is enabled in the cell 115 and the UE has the capability of CRS muting, then the cell 115 is considered as not barred, and if CRS muting is enabled in the cell 115 and the UE has no capability of CRS muting, then the cell 115 is considered as barred.

Figure 3:
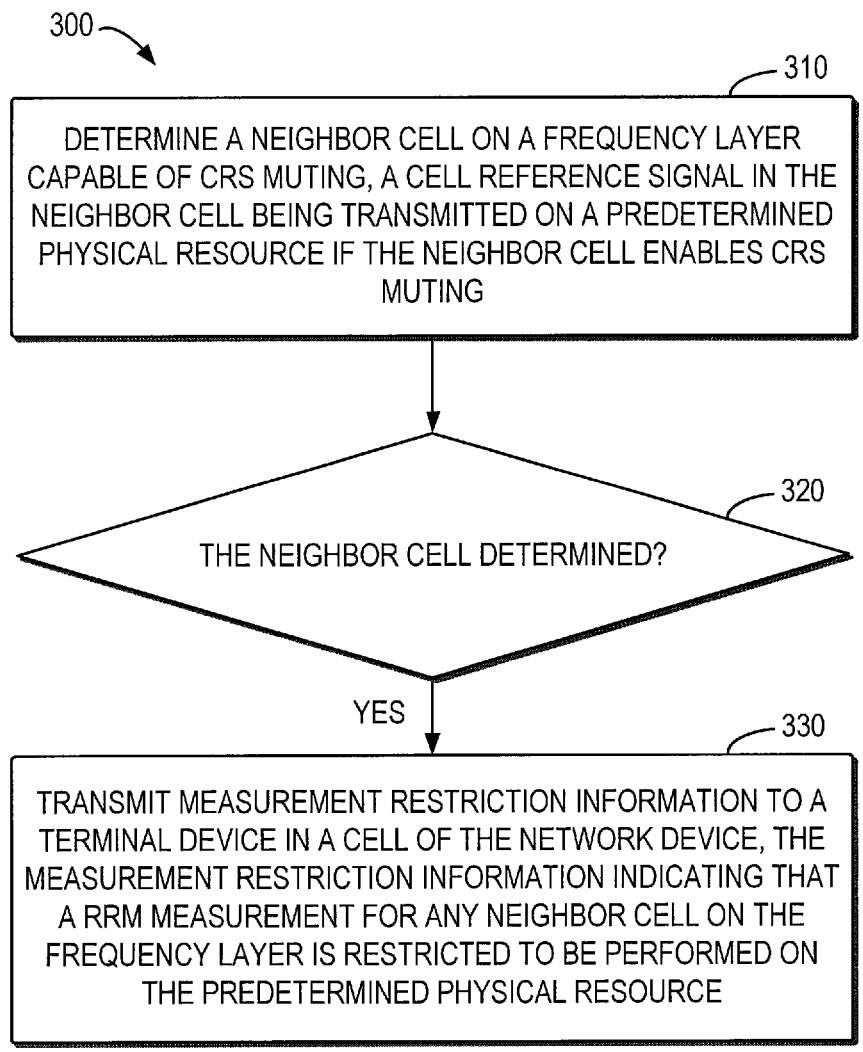
FIG. 3 shows a flowchart of an example method in accordance with some embodiments of the present disclosure.

FIG. 3 shows a flowchart of an example method 300 in accordance with some embodiments of the present disclosure. The method 300 can be implemented at the network device 110 as shown in FIG. 1 and is a detailed flowchart for the process 200 in FIG. 2. For the purpose of discussion, the method 300 will be described from the perspective of the network device 110 with reference to FIG. 1.

At block 310, the network device 110 determines a neighbor cell 125 or 135 on a frequency layer capable of CRS muting, a cell reference signal in the neighbor cell 125 or 135 being transmitted on a predetermined physical resource if the neighbor cell 125 or 135 enables CRS muting. At block 320, the network device 110 checks whether such a neighbor cell 125 or 135 capable of CRS muting is determined. At block 330, in response to the neighbor cell 125 or 135 being determined, the network device 110 transmits measurement restriction information to a terminal device 150 or 160 in a cell 115 of the network device 110, the measurement restriction information indicating that a RRM measurement for any neighbor cell on the frequency layer is restricted to be performed on the predetermined physical resource.

In some embodiments, the network device 110 may broadcast the measurement restriction information via a broadcast message. Additionally or alternatively, the network device 110 may send the measurement restriction information via dedicated RRC signaling. In some embodiments, the network device 110 may broadcast cell barred information specific to a Release-15 terminal device to prevent the Release-15 terminal device from accessing the cell. In some embodiments, the predetermined physical resource may comprise central 6 or 24 physical resource blocks in the frequency layer.

It is to be understood that all operations and features related to the network device 110 described above with reference to FIG. 2 are likewise applicable to the method 300 and have similar effects. For the purpose of simplification, the details will be omitted.

Figure 4:
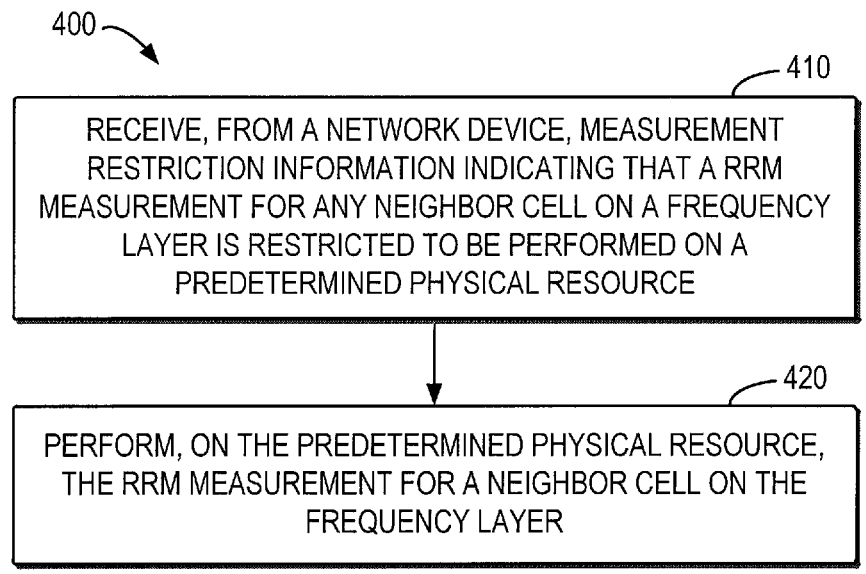
FIG. 4 shows a flowchart of an example method in accordance with some other embodiments of the present disclosure.

FIG. 4 shows a flowchart of an example method 400 in accordance with some other embodiments of the present disclosure. The method 400 can be implemented at the terminal device 150 or 160 as shown in FIG. 1 and is a detailed flowchart for the process 200 in FIG. 2. For the purpose of discussion, the method 400 will be described from the perspective of the terminal device 150 or 160 with reference to FIG. 1.

At block 410, the terminal device 150 receives, from the network device 110, measurement restriction information indicating that a RRM measurement for any neighbor cell on a frequency layer is restricted to be performed on a predetermined physical resource. At block 420, the terminal device 150 performs, on the predetermined physical resource, the RRM measurement for a neighbor cell on the frequency layer.

In some embodiments, the terminal device 150 may receive the measurement restriction information via a broadcast message or dedicated RRC signaling. In some embodiments, the terminal device 160 may be a Release-15 terminal device. In these embodiments, the terminal device 160 may receive, from a neighbor network device 110 of the neighbor cell 115, cell barred information specific to a Release-15 terminal device indicating that accessing the neighbor cell 115 is prevented, and may prevent from accessing the neighbor cell 115.

In the embodiments in which the terminal device 160 is a Release-15 terminal device, the terminal device 160 may receive, from a neighbor network device 110 of the neighbor cell 115, CRS muting information indicating whether the neighbor cell 115 enables CRS muting. In response to the neighbor cell 115 disabling CRS muting, the terminal device 160 may access the neighbor cell 115.

In response to the neighbor cell 115 enabling CRS muting, the terminal device 160 may access the neighbor cell 115 if the terminal device 160 is a Release-15 terminal device capable of operating with CRS muting, and the terminal device 160 may prevent from accessing the neighbor cell 115 if the terminal device 160 is a Release-15 terminal device incapable of operating with CRS muting.

In some embodiments, the predetermined physical resource may comprise central 6 or 24 physical resource blocks in the frequency layer.

It is to be understood that all operations and features related to the terminal device 150 or 160 described above with reference to FIG. 2 are likewise applicable to the method 400 and have similar effects. For the purpose of simplification, the details will be omitted.

In some embodiments, an apparatus for performing the method 300 (for example, the network device 110) may comprise respective means for performing the corresponding steps in the method 300. These means may be implemented in any suitable manners. For example, it can be implemented by circuitry or software modules.

In some embodiments, the apparatus comprises: means for determining a neighbor cell on a frequency layer capable of CRS muting, a cell reference signal in the neighbor cell being transmitted on a predetermined physical resource if the neighbor cell enables CRS muting; and means for in response to the determination, transmitting measurement restriction information to a terminal device in a cell of the network device, the measurement restriction information indicating that a RRM measurement for any neighbor cell on the frequency layer is restricted to be performed on the predetermined physical resource.

In some embodiments, the means for transmitting the information comprises at least one of: means for broadcasting the information via a broadcast message, and means for sending the information via dedicated RRC signaling.

In some embodiments, the apparatus further comprises: means for broadcasting cell barred information specific to a Release-15 terminal device to prevent the Release-15 terminal device from accessing the cell. In some embodiments, the predetermined physical resource comprises central 6 or 24 physical resource blocks in the frequency layer.

In some embodiments, an apparatus for performing the method 400 (for example, the terminal device 150 or 160) may comprise respective means for performing the corresponding steps in the method 400. These means may be implemented in any suitable manners. For example, it can be implemented by circuitry or software modules.

In some embodiments, the apparatus comprises: means for receiving, from a network device, measurement restriction information indicating that a RRM measurement for any neighbor cell on a frequency layer is restricted to be performed on a predetermined physical resource; and means for performing, on the predetermined physical resource, the RRM measurement for a neighbor cell on the frequency layer.

In some embodiments, the means for receiving the information comprises means for receiving the information via a broadcast message or dedicated RRC signaling. In some embodiments, the apparatus is a Release-15 terminal device. In some embodiments, the apparatus further comprises: means for receiving, from a neighbor network device of the neighbor cell, cell barred information specific to a Release-15 terminal device indicating that accessing the neighbor cell is prevented; and means for preventing from accessing the neighbor cell.

In some embodiments, the apparatus further comprises: means for receiving, from a neighbor network device of the neighbor cell, CRS muting information indicating whether the neighbor cell enables CRS muting; means for receiving, from a neighbor network device of the neighbor cell, CRS muting information indicating whether the neighbor cell enables CRS muting; means for in response to the neighbor cell enabling CRS muting, accessing the neighbor cell if the terminal device is a Release-15 terminal device capable of operating with CRS muting; and means for in response to the neighbor cell enabling CRS muting, preventing from accessing the neighbor cell if the terminal device is a Release-15 terminal device incapable of operating with CRS muting.

In some embodiments, the predetermined physical resource comprises central 6 or 24 physical resource blocks in the frequency layer.

Figure 5:
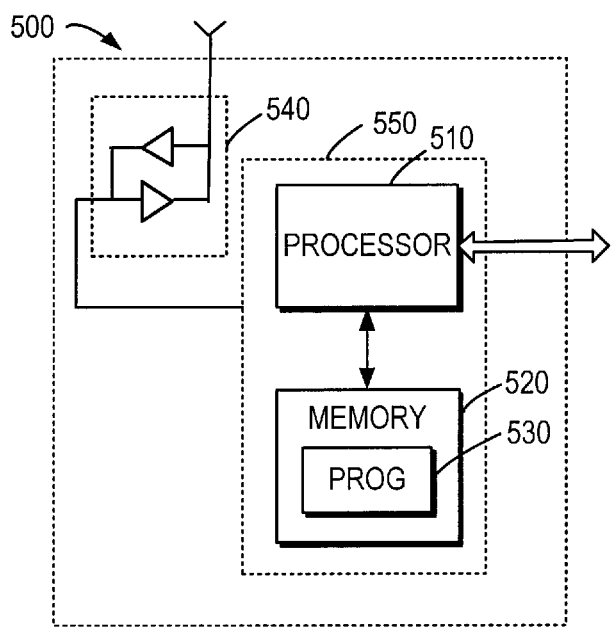
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 can be considered as a further example embodiment of the network device 110 and the terminal device 150 or 160 as shown in FIGS. 1 and 2.

Accordingly, the device 500 can be implemented at or as at least a part of the network device 110 or the terminal device 150 or 160.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 520 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 530 is assumed to include program instructions that, when executed by the associated processor 510, enable the device 500 to operate in accordance with the embodiments of the present disclosure, as discussed herein with reference to FIGS. 2 to 6. The embodiments herein may be implemented by computer software executable by the processor 510 of the device 500, or by hardware, or by a combination of software and hardware. The processor 510 may be configured to implement various embodiments of the present disclosure. Furthermore, a combination of the processor 510 and memory 520 may form processing means 550 adapted to implement various embodiments of the present disclosure.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 3 and 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented by a network device, comprising:
    determining a neighbor cell on a frequency layer capable of cell reference signal (CRS) muting, a cell reference signal in the neighbor cell being transmitted on a predetermined physical resource if the neighbor cell enables CRS muting; and
    in response to the determination, transmitting measurement restriction information to a terminal device in a cell of the network device, the measurement restriction information indicating that a radio resource management (RRM) measurement for any neighbor cell on the frequency layer is restricted to be performed on the predetermined physical resource, the method further comprising:
    broadcasting cell barred information specific to a Release-15 terminal device to prevent the Release-15 terminal device from accessing the cell.

2. The method of claim 1, wherein transmitting the measurement restriction information comprises at least one of:
    broadcasting the measurement restriction information via a broadcast message; and
    sending the measurement restriction information via dedicated radio resource control (RRC) signaling.

3. The method of claim 1, wherein the predetermined physical resource comprises central 6 or 24 physical resource blocks in the frequency layer.

4. A method implemented by a terminal device, comprising:
    receiving, from a network device, measurement restriction information indicating that a radio resource management (RRM) measurement for any neighbor cell on a frequency layer is restricted to be performed on a predetermined physical resource; and
    performing, on the predetermined physical resource, the RRM measurement for a neighbor cell on the frequency layer,
    wherein the terminal device is a Release-15 terminal device, and wherein the method further comprises:
    receiving, from a neighbor network device of the neighbor cell, cell barred information specific to a Release-15 terminal device indicating that accessing the neighbor cell is prevented; and
    preventing from accessing the neighbor cell.

5. The method of claim 4, wherein receiving the measurement restriction information comprises:
    receiving the measurement restriction information via a broadcast message or dedicated radio resource control (RRC) signaling.

6. The method of claim 4, further comprising:
    receiving, from a neighbor network device of the neighbor cell, CRS muting information indicating whether the neighbor cell enables CRS muting;
    in response to the neighbor cell disabling CRS muting, accessing the neighbor cell; and
    in response to the neighbor cell enabling CRS muting,
    accessing the neighbor cell if the terminal device is a Release-15 terminal device capable of operating with CRS muting, and
    preventing from accessing the neighbor cell if the terminal device is a Release-15 terminal device incapable of operating with CRS muting.

7. The method of claim 4, wherein the predetermined physical resource comprises central 6 or 24 physical resource blocks in the frequency layer.

8. A network device, comprising:
    a processor; and
    a memory coupled to the processor and storing instructions thereon, the instructions, when executed by the processor, causing the network device to perform acts comprising:
    determining a neighbor cell on a frequency layer capable of cell reference signal (CRS) muting, a cell reference signal in the neighbor cell being transmitted on a predetermined physical resource if the neighbor cell enables CRS muting; and
    in response to the determination, transmitting measurement restriction information to a terminal device in a cell of the network device, the measurement restriction information indicating that a radio resource management (RRM) measurement for any neighbor cell on the frequency layer is restricted to be performed on the predetermined physical resource, wherein the acts further comprise:
    broadcasting cell barred information specific to a Release-15 terminal device to prevent the Release-15 terminal device from accessing the cell.

9. The network device of claim 8, wherein transmitting the measurement restriction information comprises at least one of:
    broadcasting the measurement restriction information via a broadcast message; and
    sending the measurement restriction information via dedicated radio resource control (RRC) signaling.

10. The network device of claim 8, wherein the predetermined physical resource comprises central 6 or 24 physical resource blocks in the frequency layer.

11. A terminal device, comprising:
    a processor; and
    a memory coupled to the processor and storing instructions thereon, the instructions, when executed by the processor, causing the terminal device to perform acts comprising:
    receiving, from a network device, measurement restriction information indicating that a radio resource management (RRM) measurement for any neighbor cell on a frequency layer is restricted to be performed on a predetermined physical resource; and
    performing, on the predetermined physical resource, the RRM measurement for a neighbor cell on the frequency layer, wherein the terminal device is a Release-15 terminal device, and wherein the acts further comprise:

receiving, from a neighbor network device of the neighbor cell, cell barred information specific to a Release-15 terminal device indicating that accessing the neighbor cell is prevented; and preventing from accessing the neighbor cell.

12. The terminal device of claim 11, wherein receiving the measurement restriction information comprises:

receiving the measurement restriction information via a broadcast message or dedicated radio resource control (RRC) signaling.

13. The terminal device of claim 11, wherein the acts further comprise:

receiving, from a neighbor network device of the neighbor cell, CRS muting information indicating whether the neighbor cell enables CRS muting;

in response to the neighbor cell disabling CRS muting, accessing the neighbor cell; and in response to the neighbor cell enabling CRS muting, accessing the neighbor cell if the terminal device is a Release-15 terminal device capable of operating with CRS muting, and preventing from accessing the neighbor cell if the terminal device is a Release-15 terminal device incapable of operating with CRS muting.

14. The terminal device of claim 11, wherein the predetermined physical resource comprises central 6 or 24 physical resource blocks in the frequency layer.

15. A non-transitory computer readable medium having instructions stored thereon, the instructions, when executed on at least one processor of a device, causing the device to carry out the method according to claim 1.

* * * * *